Sept. 13, 1960   J. MÜLLER ET AL   2,952,454
RIGID AXLE SUSPENSION FOR MOTOR VEHICLES
Filed Oct. 1, 1957   3 Sheets-Sheet 1
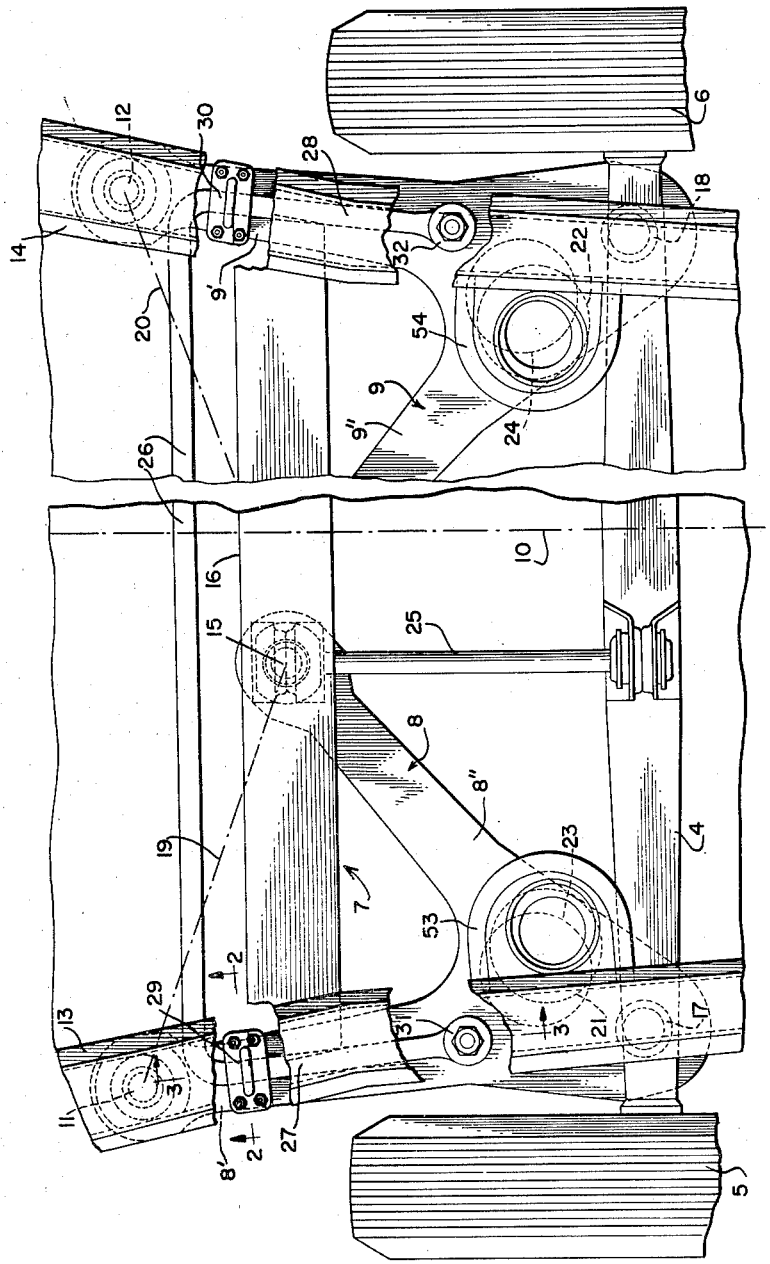
INVENTORS
JOSEF MÜLLER
FRIEDRICH H. VAN WINSEN
BY  Dicke and Craig
ATTORNEYS

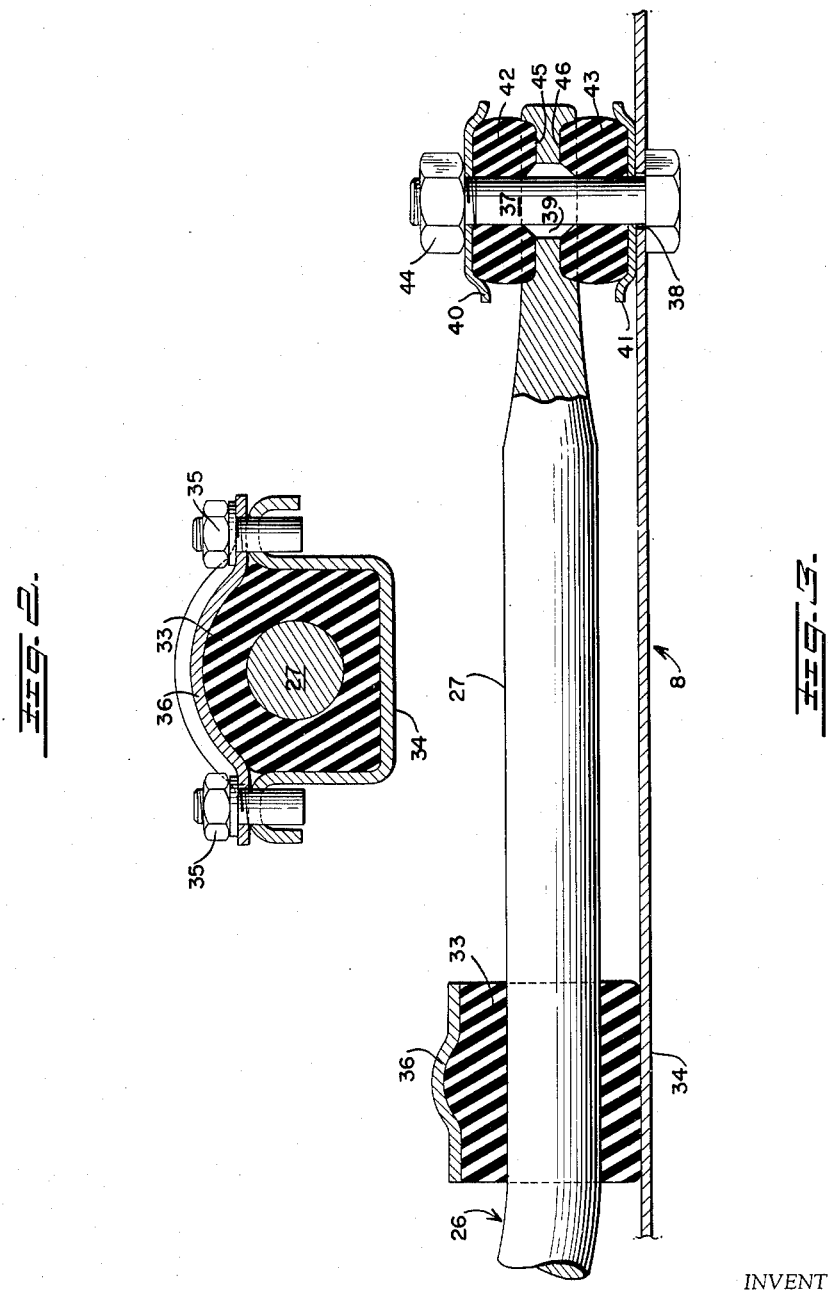

Sept. 13, 1960    J. MÜLLER ET AL    2,952,454
RIGID AXLE SUSPENSION FOR MOTOR VEHICLES
Filed Oct. 1, 1957    3 Sheets-Sheet 3

INVENTORS.
JOSEPH MÜLLER
FRIEDRICH H. VAN WINSEN
BY Dicke and Craig
ATTORNEYS

United States Patent Office 2,952,454
Patented Sept. 13, 1960

2,952,454
RIGID AXLE SUSPENSION FOR MOTOR VEHICLES

Josef Müller, Stuttgart-Riedenberg, and Friedrich H. van Winsen, Kirchheim-Teck, Germany, assignors to Daimler-Benz Aktiengesellschaft, Stuttgart-Unterturkheim, Germany Filed Oct. 1, 1957, Ser. No. 687,474
Claims priority, application Germany Oct. 1, 1956
16 Claims. (Cl. 267—11)

The present invention relates to a rigid axle construction for motor vehicles in which the frame is connected, on each side of the vehicle central longitudinal plane, with the rear axle housing by means of a longitudinally extending fork-shaped or triangularly-shaped guide link member, the apex of which is connected to the rear axle housing from below thereof and the free end or ends of which are connected to respective frame bearer members, such as longitudinal and cross bearer members, as more fully described in our copending application Serial No. 673,300, filed July 22, 1957, and entitled "Rigid Axle for Motor Vehicles."

The construction of a rear axle of this type offers, among others, the advantage that the longitudinal and transverse forces are effectively absorbed, that the rigid axle member is guided completely symmetrically, and that the coil springs, which spring-support the rear axle against the longitudinal guide link members, abut thereagainst at a distance from the rear axle so that a relatively large space is available therefor in the direction of the height thereof. On the other hand, in that case, the spring action of the spring system becomes softer by reason of the relatively larger distance of the helical springs to the rear axle which, in particular, becomes unfavorably noticeable while traversing or driving through curves, at which time a relatively stiffer spring characteristic is desirable for adequate stability.

Accordingly, the present invention proposes a rigid axle construction of this type which increases the curve stability, i.e., cornering ability of the vehicle while travelling through a curve and proposes to provide a torsion rod as stabilizer for that purpose.

According to another feature in accordance with the present invention, the stabilizer in the form of a torsion rod, used for purposes of increasing the stability in curves, is exclusively secured in a resilient manner at the longitudinal guide link members.

In connection with such an arrangement of the torsion rod, the assembly of the vehicle axle and of the suspension parts thereof at the vehicle frame may be realized in a particularly simple manner since the torsion rod does not need to be connected with the axle as well as with the frame but instead the subassembled aggregate consisting of rigid axle, guide link members and torsion rod may be mounted at the frame as a completed subassembly.

Furthermore, whereas with the usual connections of the torsion rod stabilizers at the vehicle frame, the torsion rod is ordinarily connected with the vehicle axle member by means of pivoted intermediate link members which are necessary for an essentially stress-free kinematic of the wheel spring movement, such intermediate link members, in contrast thereto, may be completely dispensed with in connection with a mounting of the torsion rod at the longitudinal guide link members in accordance with the present invention since the torsion rod, secured to the guide link members, thereby partakes in the swinging movements of the longitudinal guide link members and therewith of the wheels.

Accordingly, it is an object of the present invention to provide a suspension for a rigid axle member of a motor vehicle by means of longitudinal guide link members which also exhibits favorable spring characteristics when the vehicle passes through a curve.

Another object of the present invention is the provision of a stabilizer to counteract the soft spring characteristics obtained by effectively connecting the coil springs with the rigid axle of the motor vehicle through the longitudinal guide link members in such a manner that the coil springs abut against the longitudinal guide link members at a distance from the axle thereby normally softening the spring characteristic of such suspension.

Still another object of the present invention resides in a simple mounting of the torsion rod stabilizer at the longitudinal guide link members only which dispenses with the usual intermediate link members necessary to preserve the desired kinematics of the suspension and which ordinarily have to be connected at the respective points either pivotally or through universal joints.

A further object of the present invention resides in the provision of a spring suspension for a rigid axle member which is relatively simple, enables the use of inexpensive stamped sheet-metal parts as guide link members, and simultaneously permits proper absorption of all forces, either caused by road shocks or changes in the speed of the vehicle, without sacrifice to cornering ability of the vehicle.

A still further object of the present invention resides in the construction of a rigid rear axle and suspension therefor in which the rigid axle, the longitudinal guide link members, and the torsion rod stabilizer connected to the longitudinal guide link members may be readily mounted at the vehicle frame as a complete subassembly.

Another important object of the present invention is the provision of a torsion rod stabilizer for a rigid axle suspension by means of longitudinal guide link members in which the torsion rod stabilizer partakes in the spring movements of the wheels.

These and further objects, features and advantages of the present invention will become more obvious from the following description when taken in connection with the accompanying drawing, which shows, for purposes of illustration only, one embodiment in accordance with the present invention, and wherein:

Figure 1 is a plan view of a rigid rear axle suspension of a motor vehicle with longitudinal guide link members and provided with a torsion rod stabilizer in accordance with the present invention;

Figure 2 is a cross-sectional view through one of the connections of the torsion rod taken along line 2—2 of Figure 1;

Figure 3 is a cross-sectional view through another connection of the torsion rod taken along line 3—3 of Figure 1;

Figure 4:
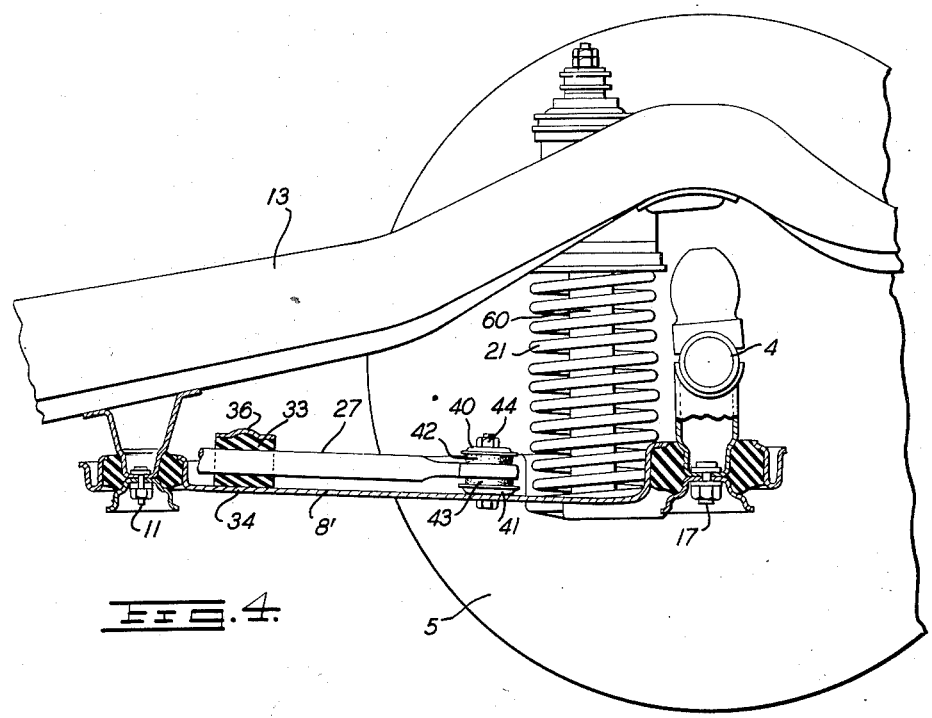
Figure 4 is a side view of the rear portion of the left longitudinal bearer member with its spring suspension and with the arm of the longitudinal guide member disposed outwardly and the connection thereof in cross section.
Figure 5:
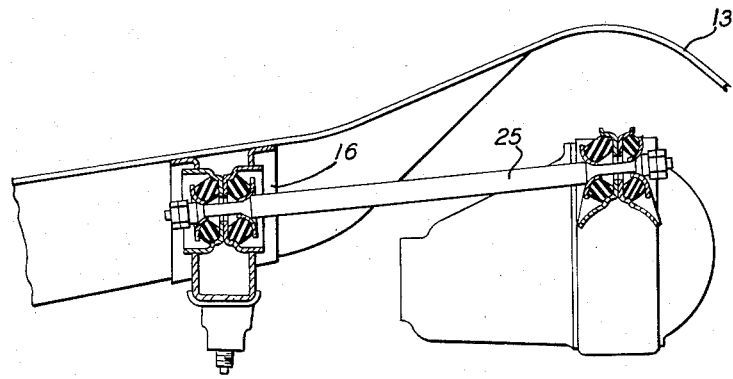
Figure 5 is a side view, partially in cross section, of the thrust strut or brace member and the connection thereof with the axle and the cross bearer member.

Referring now to the drawing, wherein like reference numerals are used throughout the various views to designate like parts, the rigid rear axle member 4 carrying the wheels 5 and 6, which may be driven by drive shafts (not shown) accommodated within axle member 4, is suspended at the vehicle frame generally designated by reference numeral 7 and consisting of a plurality of appropriately-shaped longitudinal and cross bearer members, such as longitudinal bearer members 13 and 14 and cross bearer member 16, by means of two longitudinal essentially triangularly- or fork-shaped guide link members generally designated by reference numerals 8 and 9, each having one outwardly directed longitudinal leg portion 8' and 9' and another inwardly directed longitudinal leg portion 8" and 9" extending in the longitudinal direction toward the longitudinal center plane 10 of the vehicle, thereby forming essentially fork-shaped longitudinal guide link members. The fork-shaped longitudinal guide link members 8 and 9, which are arranged symmetrically to the longitudinal center plane 10 of the vehicle, are each connected at two transversely spaced points with the vehicle frame 7, and more particularly at the free ends of the leg portions 8', 8", 9' and 9" thereof. The outer leg portions 8' and 9' of each guide link members 8 and 9 are thereby connected with the longitudinal bearer members 13 and 14 by appropriate connecting means at 11 and 12 while the inwardly directed leg portions 8" and 9" of each guide link member 8 and 9 are connected at the respective free ends thereof with the cross bearer member 16 of the vehicle frame interconnecting the longitudinal bearer members 13 and 14 by appropriate connecting means at 15 and by means of a connection corresponding to the connection 15 which is not shown in the drawing and which is arranged symmetrically thereto with respect to the central longitudinal plane 10 of the vehicle. The longitudinal guide link members 8 and 9 are further connected each at the apex portion thereof with the vehicle axle member 4 by means of appropriate connecting means at 17 and 18, respectively. The connecting means 11, 12, 15, 17 and 18 may thereby be elastic connections by the interposition of suitable rubber buffers or the like of any appropriate construction, preferably as shown in Figures 4 and 5 and more fully described in the aforementioned copending application.

During relative movements of the vehicle axle member 4 with respect to the vehicle frame 7, the longitudinal guide link members 8 and 9 will thereby swing or rotate about the respective axis 19 and 20 thereof, which pass through the centers of connections of the free ends of the leg portions 8', 8" and 9', 9", respectively, of each guide link member with the vehicle frame 7.

Coil or helical springs 21 and 22 serve in the usual manner for purposes of spring-supporting the vehicle axle member 4 against the frame 7 whereby the coil springs 21 and 22 are arranged intermediate the longitudinal guide link members 8 and 9 and the vehicle frame 7. More particularly, as may be clearly seen in Figures 1 and 4, each coil spring 21 and 22 abuts, on the one hand, against a respective guide link member 8 and 9 at a distance from the rear axle member 4 in the longitudinal direction of the vehicle and against an inwardly projecting spring abutment bracket 53 and 54 of any suitable construction and secured to the longitudinal bearer members 13 and 14, respectively, along the inside thereof. Consequently, the place of spring abutment designated by reference numerals 23 and 24 of the coil springs 21 and 22, respectively, on guide link members 8 and 9 is at a predetermined distance from the wheel axle 4. A shock absorber 60 extends through each of the coil springs 21 and 22 and the connection thereof with the frame members 13 and 14 and the guide members 8 and 9 is shown in Figure 4.

In order to properly absorb the reaction moments which may occur in a rigid axle suspension described hereinabove during starting, accelerating or braking, a thrust strut or brace member 25 in the form of a rod is provided in addition to the fork-shaped longitudinal guide link members 8 and 9 which is arranged to one side of the longitudinal center plane 10 of the vehicle between the axle member 4 and the cross bearer member 16 with both of which it is connected resiliently in any appropriate manner by the interposition of rubber buffers. Of course, two such thrust struts, arranged symmetrically to the longitudinal center plane 10, may also be provided, if so desired.

The connection of the various parts, namely of the guide link members 8 and 9 with the axle member 4 and with the frame bearer members 13, 14 and 16 as well as of the thrust rod 25 with the axle member 4 and the cross bearer member 16 are shown in Figures 4 and 5. The particularly advantageous arrangement and construction of the various parts of the axle suspension and frame as well as of the connections therebetween is similar to that shown and described in the aforementioned copending application, the subject matter of which is incorporated herein by reference.

With the construction as disclosed in the aforementioned copending application, the fork-shaped longitudinal guide members 8 and 9 may pivot about the axes 19 and 20, respectively, extending through the points of elastic connection of the leg portions thereof during relative movement between the axle 4 and the vehicle frame 7. By reason of the connection of the apex of each guide link 8 and 9 at the axle member 4 and of the leg portion 8' and 9' at the longitudinal side frame members 13 and 14, respectively, the longitudinal forces occurring at the wheels are absorbed in an effective manner, whereas by means of the additional connection 15 of the leg portion 8" and of a similar connection of the leg portion 9" at the cross bearer member 16, at points spaced inwardly with respect to the connections 11 and 12, an effective absorption of the transverse forces is additionally made possible by means of the guide links 8 and 9.

According to the present invention, a transversely extending torsion rod 26 which is operative as stabilizer is provided which is secured exclusively at the two longitudinal guide link members 8 and 9 and which includes leg portions 27 and 28 bent in the longitudinal direction and thereby forming an essentially U-shaped stabilizer together with the base portion with respect to the wheel axle member 4.

Figures 2 and 3 show the two types of the four elastic connections 29, 30, 31 and 32 of the torsion rod 26 at the leg portions 27 and 28 thereof with the guide link members 8 and 9. More particularly, Figure 2 shows the elastic connection between the leg portion 27 of the stabilizer 26 with the leg portion 8' of guide link member 8 while Figure 3 shows the connection 31 of the same leg portion 27 at the free end thereof with the guide link member 8. The connections generally designated by reference numerals 30 and 32 and disposed symmetrically on the other side of the central longitudinal plane 10 of the vehicle, connecting the leg portion 28 with the leg portion 9' of link member 9 are structurally equivalent with those designated as 29 and 31.

At the connection 29 which is located on leg portion 27 directly after the angular bent of torsion rod 26, the leg portion 27 of the torsion rod 26 is embedded in a rubber buffer 33 which surrounds the same in an annular manner. The rubber buffer 33 is arranged in a channel 34 provided in the longitudinal guide link member 8, which is enclosed on top thereof by a clamp 36 secured to the guide link member 8 by means of screws or bolts 35.

At the second connection 31 of the leg portion 27, located at one free end of the torsion rod 26, the leg portion 27 of torsion rod 26 which is traversed by a bolt 37 extending through a bore 38 provided in the longitudinal guide link member 8 and a channel or bore 39 of the torsion rod 26, is pressed against the longitudinal guide link member 8 by the interposition of two rubber buffers 42 and 43 retained by the dish-shaped or cup-shaped sheet-metal back plates 40 and 41, respectively, whereby the channel or bore 39 has considerable play with respect to the bolt 37. The rubber buffer 42 is disposed between the tightened nut 44 of the bolt 37 and the leg portion 27 of torsion rod 26 and the other rubber buffer 43 between the leg portion 27 of torsion rod 26 and the longitudinal guide link member 8. In order to improve the stability of the emplacement of the rubber buffers 42 and 43, the torsion rod 26 is provided at each end thereof with a recess or indentation 45 and 46 for each of the rubber buffers 42 and 43, respectively.

The torsion rod 26 may carry out without difficulty small relative movements with respect to the longitudinal guide link members 8 and 9 during swinging movements thereof about their respective axes 19 and 20 as a result of the particular connection therewith.

While we have shown and described one embodiment in accordance with the present invention, it is understood that the same is not limited thereto but is susceptible of many changes and modifications in accordance with the present invention, and we intend to cover all such changes and modifications as encompassed by the appended claims.

We claim:

1. A suspension system for suspending a rigid axle at a vehicle frame having a longitudinal side frame member on each side of the vehicle, comprising longitudinal guide means disposed on each side of the vehicle central longitudinal plane and extending essentially in the longitudinal direction and having outer and inner end portions, means connecting the outer end portion of each of said guide means to said axle, means connecting the inner end portions of said guide means to said frame at two points thereof displaced in the longitudinal and transverse direction from each other with a line connecting said two points constituting a pivoting axis for said longitudinal guide means, and stabilizing means for said axle including a torsion rod, and means securing said torsion rod exclusively at said guide link means.

2. A suspension system according to claim 1, wherein said last-mentioned securing means includes yieldable means to enable relative movement between said torsion rod and said guide link means.

3. A suspension system according to claim 1, wherein said torsion rod is essentially U-shaped and includes two angularly-bent leg portions extending essentially in the longitudinal direction of the vehicle.

4. A suspension system according to claim 3, wherein said securing means includes a first connection for each of said leg portions directly adjacent the angular bent of said torsion rod and a second connection for each leg portion near the free end thereof.

5. A suspension system according to claim 4, wherein said first connection includes elastic means annularly surrounding a respective leg portion of the torsion rod.

6. A suspension system according to claim 5, wherein each of said guide means is provided with a channel portion accommodating therein said elastic means, and clamp means secured to said guide link means and enclosing said channel on top thereof.

7. A suspension system according to claim 1, wherein said torsion rod is essentially U-shaped and includes angularly-bent leg portions extending essentially in the longitudinal direction of the vehicle, and wherein said securing means includes elastic securing means for securing a respective free end of said torsion rod to said guide link means.

8. A suspension system for suspending a rigid axle at a vehicle frame having a longitudinal side frame member on each side of the vehicle, comprising longitudinal guide means disposed on each side of the vehicle central longitudinal plane and extending essentially in the longitudinal direction and having outer and inner end portions, means connecting the outer end portion of each of said guide means to said axle, means connecting the inner end portions of said guide means to said frame, stabilizing means for said axle including a torsion rod, and elastic securing means including bolt means for securing a respective free end of said torsion rod exclusively at said guide link means, said torsion rod being essentially U-shaped and including angularly bent leg portions extending essentially in the longitudinal direction of the vehicle, said last-mentioned elastic securing means including a rubber buffer intermediate a respective guide means and a respective free end of said torsion rod and another rubber buffer intermediate said free end and said securing means including bolt means, said bolt means extending through both of said elastic buffers and through said free end of said torsion rod as well as through the guide means.

9. A suspension system according to claim 8, wherein said free end is provided with indentations to accommodate therein the rubber buffers.

10. A suspension system for suspending a rigid axle at the vehicle frame including a longitudinal side frame member on each side of the vehicle and a cross bearer member connecting said side frame members, comprising a longitudinal fork-shaped guide member having two leg portions and an apex portion, one member each being disposed on each side of the vehicle central longitudinal plane, first means connecting each of said guide members at the apex portion thereof to said axle and near the free ends of said leg portions to said longitudinal and cross bearer members, respectively, the connections of the free ends of each guide member being spaced in the transverse direction of the vehicle to enable absorption of the transverse forces, means including a thrust rod for absorbing the reaction moments due to changes in the vehicle speed, second means connecting said thrust rod between said frame and said axle, stabilizer means including a torsion rod, and third means connecting said stabilizer means exclusively at said guide link members.

11. A suspension system according to claim 10, wherein all of said connecting means are elastic connections.

12. A suspension system according to claim 10, further comprising spring means spring supporting said axle against said frame and abutting against a respective guide link member at a distance from said axle, said torsion rod being essentially U-shaped and including two angularly bent leg portions extending essentially in the longitudinal direction of the vehicle.

13. A suspension system according to claim 12, wherein said third means includes two elastic connections for each leg portion of said torsion rod adjacent each angular bent and near each free end thereof.

14. A suspension system according to claim 13, further comprising shock absorber means within said spring means and connected between said frame and a respective guide link member, each of said elastic connections of said third means including rubber buffer means to enable slight relative universal movement of said torsion rod with respect to said guide link members.

15. A suspension system according to claim 10, wherein said torsion rod is essentially U-shaped and includes angularly-bent leg portions, and wherein said third connecting means includes two elastic connections for each leg portion of said torsion rod spaced a relatively large distance apart.

16. A suspension system for suspending a rigid axle at a relatively stationary vehicle part, comprising a pair of longitudinal fork-shaped guide members each having two leg portions and an apex portion, one member each being disposed on each side of the central longitudinal plane of said stationary part, first means pivotally connecting each of said guide members at the apex portion thereof to said axle and near the free ends of said leg portions to said stationary part, the connections of the free ends of each guide member being spaced in the transverse direction of said stationary part to enable absorption of the transverse forces, means including a thrust rod for absorbing the reaction moments due to changes in the vehicle speed, second means connecting said thrust rod between said stationary part and said axle, stabilizer means including a torsion rod, and third means connecting said stabilizer means exclusively at said guide members.

References Cited in the file of this patent

UNITED STATES PATENTS

| | | |
|---|---|---|
| 1,137,720 | Anderson | Apr. 27, 1915 |
| 2,218,634 | Best | Oct. 22, 1940 |
| 2,236,410 | Leighton | Mar. 25, 1941 |
| 2,483,974 | Hicks et al. | Oct. 4, 1949 |
| 2,626,797 | Cuskie | Jan. 27, 1953 |
| 2,692,770 | Nallinger et al. | Oct. 26, 1954 |
| 2,731,257 | Hansen | Jan. 17, 1956 |

FOREIGN PATENTS

| | | |
|---|---|---|
| 1,085,735 | France | July 28, 1954 |